TAPE QUANTITY SENSING AND WINDING CONTROL APPARATUS

Filed Feb. 23, 1961

3 Sheets-Sheet 1

INVENTORS
MAURICE L. BOUDREAU
THOMAS S. STEELE
BY Kenneth D. Ohm
ATTORNEY

TAPE QUANTITY SENSING AND WINDING CONTROL APPARATUS

Filed Feb. 23, 1961 3 Sheets-Sheet 2

INVENTORS
MAURICE L. BOUDREAU
THOMAS S. STEELE
BY Kenneth D. Ohm
ATTORNEY

Feb. 25, 1964 T. S. STEELE ETAL 3,122,333

TAPE QUANTITY SENSING AND WINDING CONTROL APPARATUS

Filed Feb. 23, 1961 3 Sheets-Sheet 3

INVENTORS
MAURICE L. BOUDREAU
THOMAS S. STEELE

BY *Kenneth D. Ohm*

ATTORNEY 3,122,333

TAPE QUANTITY SENSING AND WINDING CONTROL APPARATUS

Thomas S. Steele, Minneapolis, and Maurice L. Boudreau, Isanti, Minn., assignors to General Mills, Inc., a corporation of Delaware Filed Feb. 23, 1961, Ser. No. 91,016
3 Claims. (Cl. 242—55.12)

This invention relates to tape reeling, winding and feeding systems and more particularly to tape quantity sensing and winding control apparatus. The invention is particularly well adapted for use with a magnetic tape memory device in conjunction with an automatic digital computer.

In some devices wherein tape reeling and winding is required, for example, in a computer, it is often desirable to start and stop the tape very rapidly as well as reverse the direction of travel of the tape in a fraction of a second. In some computers, utilizing tape travelling at speeds on the order of 150 inches per second, it is desirable to start and stop the tape and reverse its direction of travel in less than 3 milliseconds. It has been found impractical to attempt to start and stop the storage reels upon which the tape is wound at accelerations on the order of those just mentioned because of the relatively large mass of the reel and the tape wound thereon. It has therefore been proposed previously that a quantity of unwound tape can be stored in suitable bins located between a transducer and each storage reel. Because of the slack tape provided in each bin, that portion of the tape passing over the transducer can be accelerated and decelerated by a separate drive or capstan more readily than the reels.

To make possible rapid acceleration of the tape it is desirable to have available a relatively large quantity of unwound tape on either side of the transducer. At the same time it is necessary to provide accurate coordination between the reel drive and capstan drive.

The present invention provides a tape sensing and winding control apparatus having almost instantaneous response speed. Moreover, according to the present invention, mechanical sensing of the amount of tape contained in the storage bins is not required. Consequently no delay results from inertia of the sensing device. The sensing means of the present invention is totally free of moving mechanical parts. The parts that are required can be simply constructed and do not require precision workmanship. The sensing device of the present invention is economical to construct and maintain. A high order of reliability is gained through mechanical simplicity. Moreover, the invention allows the storage of a relatively large quantity of tape in each of the storage bins, thereby permitting very rapid acceleration of the tape through the capstan without the danger that the supply of tape in one of the bins may be exhausted before the reel from which the tape is withdrawn to fill the bin has accelerated to the necessary speed, thereby reducing greatly the chance for breakage of the tape.

It is thus one object of the present invention to provide an improved tape quantity sensing and winding control apparatus wherein a relatively large quantity of unwound tape can be stored and wherein the quantity of stored tape can be sensed almost instantaneously.

It is another object of this invention to provide an improved tape quantity sensing and winding control device wherein relative large amounts of unwound tape can be stored and wherein the means for sensing the amount of tape thus stored is free from moving parts.

It is yet another object of this invention to provide an improved tape quantity sensing and winding control system wherein a relatively large quantity of unwound tape can be stored between each of the tape storage reels and the transducer and wherein the quantity of unwound tape stored in each of the bins can be controlled separately without the use of moving parts.

Additional objects of the invention will appear from the following description in conjunction with the accompanying drawings in which a preferred embodiment has been set forth in detail and wherein.

Figure 1:
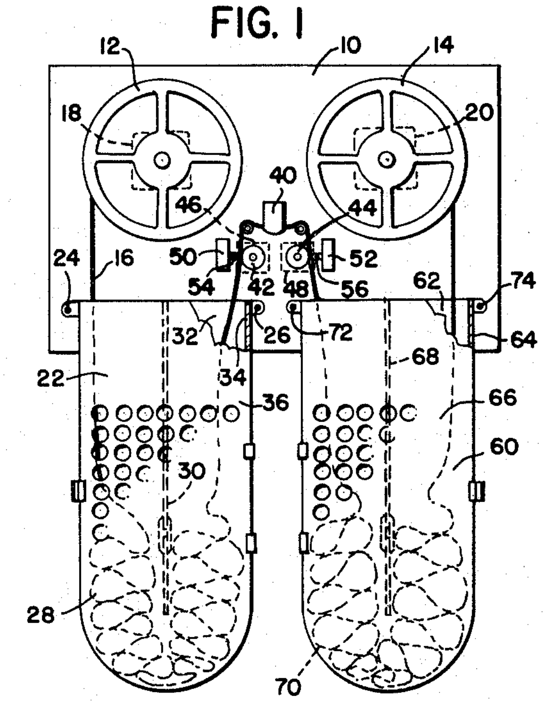
FIGURE 1 is a side elevation of a tape handling apparatus employing the present invention.
Figure 2:
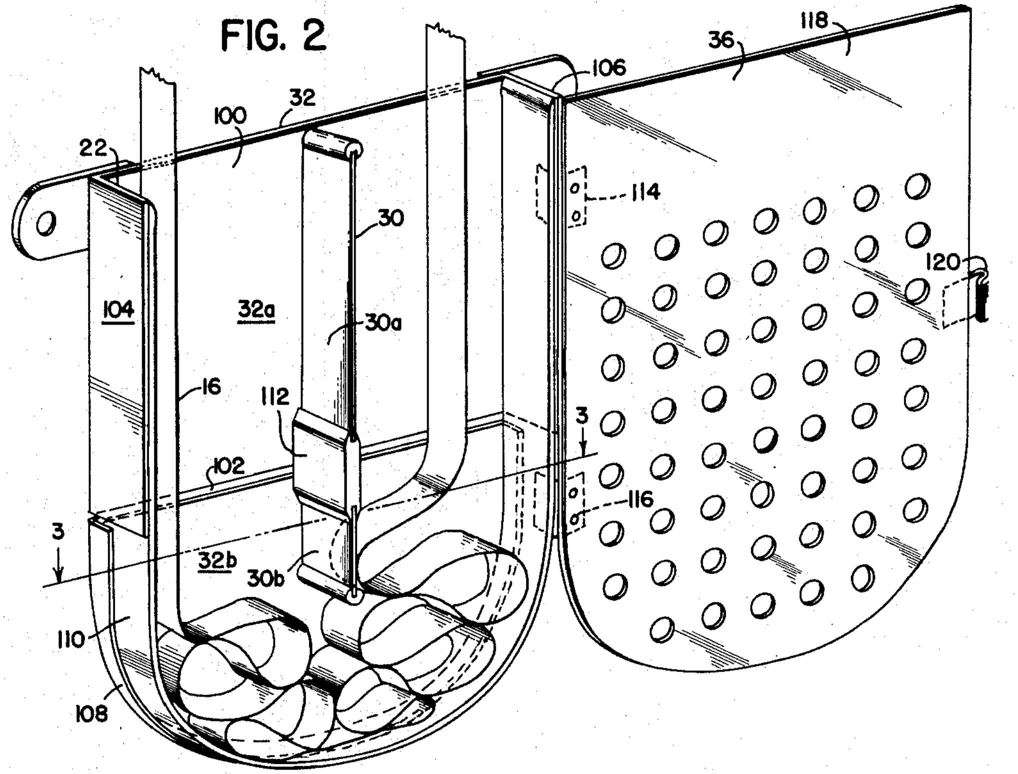
FIGURE 2 is a perspective view of one of the tape storage bins of FIGURE 1.
Figure 3:
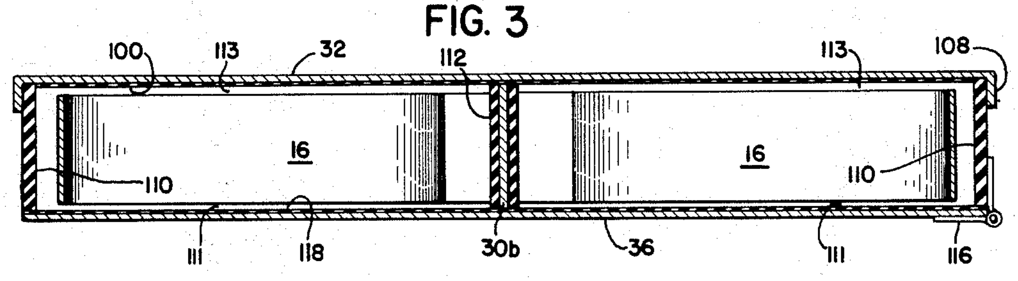
FIGURE 3 is a vertical sectional view taken along line 3—3 of FIGURE 2.

Referring now to FIGURES 1–3, there is shown a tape handling apparatus according to the present invention including a frame member 10 having rotatably mounted thereon two tape reels 12 and 14, each adapted to hold a supply of tape 16 such as magnetic recording tape. The reel 12 is operatively connected to a reversible drive motor 18 while the reel 14 is operatively connected to a reversible drive motor 20. As tape is unreeled from the reel 12, it falls downwardly into a first tape storage means or bin 22 which is secured to the frame member 10 in a position beneath the reel 12 by any suitable fastening means such as screws 24 and 26. The tape entering the bin 22 falls to the bottom of the bin and takes on a number of transverse folds indicated at 28. The bin 22 is thus adapted to hold a relatively large supply of unwound tape. To prevent tangling of incoming tape with the tape leaving the bin, the bin 22 is divided into two parts by means of a vertically disposed divider 30. The bin 22 includes a back wall 32, a side wall 34, and a front wall 36. The width of the bin 22 from the front wall to the back wall is made slightly greater than the width of the tape 16.

The tape 16 passing upwardly on the right side of the divider 30 extends across a transducer 40 which is used for recording and picking up information on the tape. Transducer 40 is connected to the frame 10. Motion of the tape 16 past the transducer 40 is controlled by means of driven capstan rollers 42 and 44 which are also mounted on the frame 10. The roller 42 is driven continuously in a counterclockwise direction by a motor 46 while the roller 44 is driven continuously in a clockwise direction by means of a motor 48. Activation of either of relays 50 or 52 by means of a manual control or by means of a programmed electric signal, as desired, causes one of idler rollers 54 or 56 respectively to move inwardly against the surface of tape 16 so as to force a portion of tape 16 into tangential abutting relationship with rollers 42 and 44 respectively. Since the capstan rollers 42 and 44 run in opposite directions, the tape 16 passing over the transducer 40 can be rapidly stopped and rapidly accelerated in the opposite direction depending upon which of the relays 50 or 52 is activated. In digital computers in which the tape may travel past the transducer 40 at a speed on the order of 150 inches per second, it is possible by means of the capstan drive described to rapidly start, stop, and reverse the direction travel of that portion of the tape 16 passing across the transducer 40.

Tape passing across the transducer 40 from left to right as viewed in FIGURE 1 passes downwardly between the rollers 44 and 56 into a second storage means or bin 60 which is similar in construction to the bin 22.

Depending upon the direction of rotation of the reel 12 and the motor 18, the drive motor 18 and reel 12 serve as a first feed means to feed tape into the bin 22 or a first tape withdrawal means to withdraw tape from the bin 22 while the reel 14 and the drive motor 20 serve as a second tape feed means to feed tape into the bin 60 and a second tape withdrawal means to withdraw tape from the bin 60.

The bin 60 includes a back wall 62, side wall 64 and front wall 66. The tape passing into the bin 60 from the transducer 40 enters at the left of a central divider 68 as viewed in FIGURE 1. The tape interposed between the walls 62 and 66 takes on a number of transverse folds indicated at 70. The tape passing through the bin 60 from left to right moves upwardly at the right of the divider 68 as viewed in FIGURE 1 and finally is wound onto the reel 14. The bin 60 may be attached to the frame 10 by any suitable connecting means such as screws 72 and 74.

Referring now particularly to FIGURES 2 and 3, there is shown the details of construction of the storage bin 22. While only the storage bin 22 is shown in FIGURES 2 and 3, it will be understood that the storage bin 60 is similar in construction. The storage bin 22 includes a flat back wall 32 formed from sheet metal comprising an upper wall member 32*a* and a lower wall member 32*b*. A suitable insulating material is preferably interposed between each of the bin walls or plates and the tape. To accomplish this objective, the inside surface of the wall 32*a* is preferably coated with a suitable insulating coating 100 such as an insulating paint or any other suitable non-conductor of electricity. The wall member 32*b* is also preferably coated with a suitable insulating coating 100. Wall member 32*b* is separated from 32*a* by means of an air gap 102. As can be seen in FIGURES 1 and 2, the bottom of each of the bins is generally rounded. Along each edge of the wall member 32*a* are provided integral side wall members 104 and 106. Wall member 32*b* is provided with an integral flange 108 extending outward from the rounded edge thereof. Affixed to the inside surfaces of walls 104, 106, and flange 108 by means of a suitable cement or any other fastening means is a strip of insulating material 110 having the same width as the walls 104 and 106. The divider 30 comprises an upper member 30*a* and a lower member 30*b* connected by means of an electrical insulator 112. The divider 30 may be attached to the back wall 32 by any suitable connecting means. The front wall 36 of the bin 22 comprises an access door formed from sheet metal. Wall 36 is connected to the side wall 106 and insulating strip 110 by means of hinges 114 and 116 respectively. The inside surface of wall 36 is also coated with a suitable non-conductor of electricity 118 such as an insulating paint. A suitable latch 120 is connected to the free edge of the wall 36 to hold it in a closed position. The wall 36 is provided with a plurality of openings to allow free passage of air into and out of the bin.

The walls 32*b* and 36 of bin 22 thus comprise first and second generally parallel electrically conductive plates, while similar portions of the walls 62 and 66 of bin 60 comprise third and fourth generally parallel electrically conductive plates.

If the tape is a nonconductor of electricity, that part of the tape positioned between the plates of either of the bins acts as a dielectric material, thus changes in the amount of tape in one of the bins will cause corresponding changes in the capacitance between the conductive walls or plates of the bin due to changes in the amount of dielectric material interposed between the plates. It was discovered that this change in capacitance can be used to maintain the amount of tape stored in each bin between predetermined desired limits as explained more fully hereinbelow.

It was also discovered that if the tape is formed from a conductor of electricity or is provided with an electrically conductive coating, changes in capacitance between the bin walls on either side of the tape will nevertheless be present, but will result from a different phenomenon. Moreover, if the tape is conductive, changes in the capacitance between the walls, upon addition or withdrawal of a given amount of tape will be substantially greater than will occur when the tape is a nonconductor. This result is desirable because it makes possible increased sensitivity in detecting the amount of tape present in the bin. Thus the use of tape having a conductive coating is preferred. When tape having a conductive coating is used, the capacitance between the walls is governed largely by the spacing across the gaps designated 111 and 113 in FIGURE 3 between the side edges of the tape and the walls. Thus, changes in the amount of tape in the bin alter the effective spacing between the walls 32*b* and 36.

The means used to sense the quantity of tape in each bin and to control the operation of reel drive motors 18 and 20 will now be explained.

Figure 4:
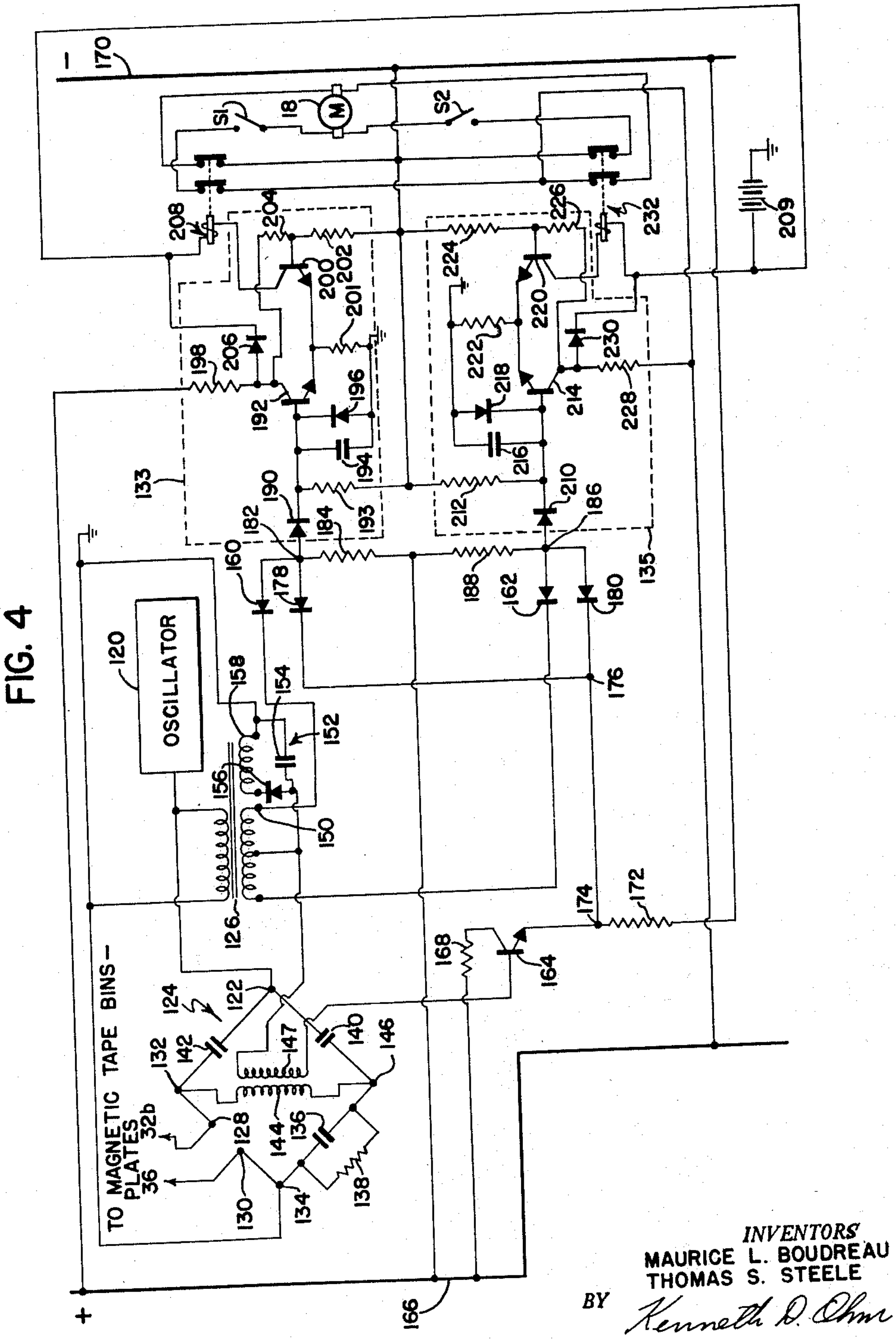
FIGURE 4 is a schematic wiring diagram illustrating a circuit used to sense the quantity of tape contained in each of the storage bins and to control the operation of the storage reels.

While various types of circuits may be used to sense the changes in the capacitance between the walls of 32*b* and 36 of the bin 22 and the corresponding walls of the bin 60, a preferred circuit shown in FIG. 4 includes a capacitive bridge detecting circuit wired to the walls of one of the bins for establishing a first signal, an oscillator circuit for establishing a reference signal, means for comparing the first signal from the capacitive bridge detecting circuit with reference signal from the oscillator, a first triggering circuit adapted to operate a first relay means when the said first two signals are in phase, and a second triggering circuit adapted to operate a second relay means when said first signal and said reference signal are out of phase. Specifically, we prefer to employ a first and a second capacitive sensing means wired in series with the first and second pairs of bin walls respectively. First and second control means are operatively connected between the first and second sensing means and a first and second feed and withdrawal means respectively for feeding tape into and withdrawing tape from the bins. Each sensing means preferably includes a capacitive bridge detector circuit, an oscillator wired to the capacitive bridge detector circuit, and a means for comparing the signals from the oscillator with the signal from the detector circuit. The first and second control means preferably comprises a first triggering circuit wired to the detector circuit and the oscillator which is adapted to operate when the capacitance between the walls of the bin reaches a first predetermined upper limit and also a first relay operable by said first triggering circuit which is adapted to operate said withdrawal means. The second triggering circuit is also operatively connected to said oscillator and said capacitive bridge detector circuit. The second triggering circuit is operable when the capacitance between the walls reaches a second predetermined lower limit. Second relay is operatively connected to the second triggering circuit and is adapted to operate the feed means when the second triggering circuit is operated. The operation of the feed and withdrawal means is preferably halted when the capacitance between the walls falls between said first predetermined level and said second predetermined level.

Referring now to FIGURE 4, there is shown an oscillator 120 for generating a reference signal. The oscillator 120 is connected to a junction 122 of a capacitive bridge detecting circuit 124 and to one end of the primary coil of a transformer 126. The other end of said primary coil is grounded. The bridge circuit 124 includes terminals 128 and 130 to which the opposed walls of one of the tape storage bins of 22 or 60 are wired. The terminal 128 is connected to a junction 132 while the terminal 130 is connected to a grounded junction 134. The junctions 134 and 122 are linked together by a capacitor 136 in parallel with a resistor 138 both of which are in series with a capacitor 140. The junction 132 is connected through a capacitor 142 to the junction 122 and through a coil 144 to a common point 146 located between the resistor 138 and the capacitor 140.

Inductively linked to the coil 144 is a coil 147, one end of which is connected to the center tap 150 of the secondary coil of the transformer 126. The center tap 150 is grounded through a biasing circuit 152 comprised of a capacitor 154 shunted by a diode 156 connected in series with a coil 158. One end of the secondary of the transformer 126 is connected to the cathode of a diode 160. The other end of the secondary of the transformer 126 is connected to the cathode of a diode 162.

One end of the coil 147 is connected to the biasing circuit 152 while the other end of the coil 147 is wired to the base of a transistor 164. The collector of the transistor 164 is linked to a positive bus 166 through a resistor 168 while the emitter is linked to a negative bus 170 through a resistor 172. A common point 174 located between the emitter of the transistor 164 and the resistor 172 is wired to a junction 176. Diodes 178 and 180 have their cathodes connected together at the junction 176.

The anodes of the diodes 160 and 178 are connected together at a common point 182. The point 182 is linked to the positive bus 166 through a resistor 184. The anodes of diodes 162 and 180 are linked together at a common point 186 which in turn is connected to the positive bus 166 through a resistor 188.

A diode 190 has its anode connected to the point 182 while its cathode is connected to the base of a transistor 192. A resistor 193 connects the cathode of the diode 190 to the negative bus 170. A capacitor 194 and a diode 196 are connected in parallel between ground and the base of the transistor 192. The collector of the transistor 192 is connected to the positive bus 166 through a resistor 198 while the emitter of said transistor is connected to the emitter of a transistor 200. Both of said emitters are connected to ground through a resistor 201.

The base of the transistor 200 is linked to the negative bus 170 through a resistor 202 and to the collector of the transistor 192 through a resistor 204. The collector of the transistor 192 is linked through a diode 206 through a battery 209 to ground. The cathode of the diode 206 is connected to the collector of the transistor 200 through the coil of a relay 208. The relay 208 operates a pair of contacts which are normally closed.

Referring now to the diodes 162 and 180, their common point of connection 186 is linked to the negative bus 170 through a diode 210 and a resistor 212 connected in series. The common point between the diode 210 and the resistor 212 is connected to the base of a transistor 214. The base of the transistor 214 is connected to ground through the parallel connection of a capacitor 216 and a diode 218. The emitter of the transistor 214 is connected to the emitter of a transistor 220. Said emitters are connected to ground through a resistor 222. The base of the transistor 220 is linked to the negative bus 170 through a resistor 224 and to the collector of the transistor 214 through a resistor 226. The collector of the transistor 214 is connected to the positive bus 166 through a resistor 228 and to the collector of the transistor 220 through a diode 230 and the coil of a relay 232. The relay operates a pair of contacts which are normally closed. The cathode of the diode 230 is connected to ground through the battery 209.

The normally closed relays 208 and 232 control the direction of rotation of a reversible motor 18 as follows. With the contacts of the relays 208 and 232 open, the motor does not rotate. With the contacts of the relay 232 open and the contacts of the relay 208 closed current flows through the motor 18 in one direction from the positive bus 166 to the negative bus 170. This causes the motor 18 to rotate in a first direction. With the contacts of the relay 208 open and the contacts of the relay 232 closed, the current from the positive bus 166 to the negative bus 170 will flow through the motor 18 in the opposite direction. This causes the motor 18 to rotate in a second direction opposite from the first direction. Thus it will be seen that by properly controlling the opening or closing of the contacts of relays 208 and 232 one can cause the motor 18 to remain motionless, to rotate in one direction or to rotate in the reverse direction. Switches $S_1$ and $S_2$ are wired between relays 208 and 232 respectively and the motor 234 for purposes hereinafter explained. The box designated 133 comprises a first triggering circuit and the box designated 135 comprises a second triggering circuit.

The circuit of FIGURE 4 provides means whereby the contacts of the relays 208 and 232 can be caused to remain open or closed depending upon the amount of tape contained in a storage bin like 22. The circuit of FIGURE 4 operates as follows to control the rotation of the motor 18. The capacitors 136, 140 and 142 are selected so they have the same capacity value. This capacity value is somewhat larger than the capacity of the bin 22 with no tape in it. With the points 128 and 130 connected to the walls **32*b* and 36 of a bin like bin 22 shown in FIGS. 1–3, there will be a predetermined amount of tape which when placed in said bin will cause said bin capacity value to increase to exactly the capacity value of capacitors 136, 140 and 142. As is well known in the art, the bridge 124 will then be balanced and no current will flow in coil 144. The resistor 138** performs the function of compensating for the slight unbalance which would otherwise occur due to dissipative effects in the tape and/or its conductive coating.

When the aforementioned predetermined amount of tape in the bin 22 is increased or decreased the bridge 124 goes out of balance and an alternating current will flow through the coil 144. When tape over and above the predetermined amount is added to the bin 22 the capacitance between the walls **32*b* and 36 increases and a first alternating signal will flow through the coil 144. On the other hand when tape less than said predetermined amount of tape remains in the bin 22, the capacitance between the walls 32*b* and 36 decreases and a second alternating signal 180° out of phase from the above mentioned first alternating signal will flow through the coil 144**.

As mentioned above when the bin 22 has more tape therein than the predetermined amount a first alternating signal will flow through the coil 147. Since the current flowing through the coil 144 is an alternating signal, it induces an alternating current in the coil 147 which impresses an alternating voltage upon the base of the transistor 164. The transistor 164 amplifies this voltage and transmits a first signal in accordance therewith to the diodes 178 and 180. At the same time due to the connection of the oscillator 120 with the transformer 126 and the connection of the diodes 160 and 162 to said transformer there is impressed on the cathodes of said diodes alternating reference signals which are 180° out of phase. Because of the arrangement of the elements of the circuit of FIGURE 4 the above mentioned reference signals will always be, separately, either in phase or 180° out of phase with the output signal of the transistor 164.

For the purpose of the ensuing explanation it will be assumed that the first signal, i.e., the output signal of the transistor 164 is in phase with the signal impressed upon the diode 160, i.e., the reference signal. Under these circumstances the cathodes of the diodes 160 and 178 will have impressed thereon an in phase, alternating voltage. For the purpose of this discussion said voltage will be large enough so when they are positive they will drive the cathodes of the diodes 160 and 178 positive with respect to their anodes and thus said diodes will cut off. This will permit a sufficient positive voltage to appear on the anode of the diode 190 which will cause said diode to conduct. When the diode 190 conducts the capacitor 194 becomes charged.

Transistor 192 conducts when the base of said transistor is positive with respect to emitters thereof. Capacitor 194 is therefore adjusted so that after several cycles the side connected to the base of transistor 192 has reached sufficient positive voltage to make transistor 192 conduct. When diode 190 is not conducting, the capacitor 194 provides a sufficient charge on the base of transistor 192 to keep it conducting. When the incoming signals to the cathodes of diodes 160 and 178 are positive diode 190 will conduct current to the base of transistor 192. This keeps transistor 192 in operation while the incoming signals are negative. If, however, one of the incoming signals is zero or out of phase with the other signal, the diode 190 will remain permanently nonconductive. When diode 190 is nonconductive, the capacitor 194 will quickly discharge thereby cutting off transistor 192. While transistor 192 is not conducting diode 196 will fix the base voltage of transistor 192 at a slight negative value to assure that transistor 192 will remain nonconducting.

When the transistor 192 is not operating, the base of the transistor 200 has impressed thereon a current from the positive bus 166 through the resistor 198 and the resistor 204. When the transistor 192 starts to operate a portion of the aforesaid current is diverted to the collector of the transistor 192. This diverted current is necessary for the operation of the transistor 200. When it is diverted to the collector of the transistor 192, it causes the transistor 200 to stop functioning. When the transistor 200 stops functioning the current through the coil of relay 208 drops off and the contacts of said relay are moved to their closed positions by a spring (not shown). With the contacts of the relay in their closed positions a current flows through the motor 18 which causes said motor to rotate in what will be called a clockwise direction for the purposes of this explanation. The clockwise rotation of motor 18 will cause the reel 12 to also rotate clockwise and thus remove tape from the bin 22.

When the bin 22 has less tape therein than the predetermined amount desired, the capacitance between the walls 32*b* and 36 decreases. This decrease in capacitance causes the aforementioned second alternating signal to flow through the coil 144. As previously noted said second alternating signal is 180° out of phase from the first alternating signal which flows in the coil when the tape in the bin 22 exceeds the desired predetermined amount of said tape. The second alternating signal is impressed upon the base of the transistor 164. The transistor 164 amplifies this signal and transmits to the diodes 178 and 180. This first alternating signal will be in phase with the reference signal emitted by the half of the secondary coil of the transformer 126 connected to the cathode of the diode 162. Thus, the alternating signals impressed upon the cathodes of the diodes 162 and 180 will be in phase. For the purpose of this discussion, said first and second signals will be large enough so when they go positive they will drive said cathodes of the diodes 160 and 180 positive with respect to their anodes and said diodes will cut off. This will permit the point 186 to become sufficiently positive to cause the diode 210 to conduct.

The operation of transistor 214 is controlled in the manner described above in connection with transistor 192. Capacitor 216 and diode 218 perform the same function as described previously in connection with capacitor 194 and diode 196. When the diode 218 conducts it impresses a current upon the base of the transistor 214 which causes said transistor to operate. As long as the transistor 214 is not operating, the transistor 220 draws current from the positive bus 166 through the resistors 228 and 226. When the transistor 214 starts to operate, a portion of this current is diverted to the collector of the transistor 214. This diverted current is necessary for the continued operation of the transistor 220. When the transistor 220 cuts off, current through the coil of the relay 232 is cut off. Its associated contacts then move to their closed position by the action of a spring (not shown). With said contacts in their closed position current flows through the motor 18 which causes said motor to rotate in a direction opposite from that which it rotates when the contacts of the relay 208 were closed. That is, the motor 18 is caused to rotate in a counterclockwise direction. The counterclockwise rotation of motor 18 causes the reel 12 to rotate counterclockwise and to feed tape into the bin 22.

Switches $S_1$ and $S_2$ should be kept open until the D.C. power to the detector and control circuit is turned on. When D.C. power is turned on, transistors 200 and 220 will conduct thereby energizing the relays 208 and 232 respectively and thus opening the contacts of the relays. Switches $S_1$ and $S_2$ can then be closed for normal operation.

From the foregoing description of the operation of the circuit of FIGURE 4 it will be readily apparent that the motor 20 as well as the motor 18 can be caused to feed tape into or withdraw tape out of the bins 22 and 60 respectively.

Figure 5:
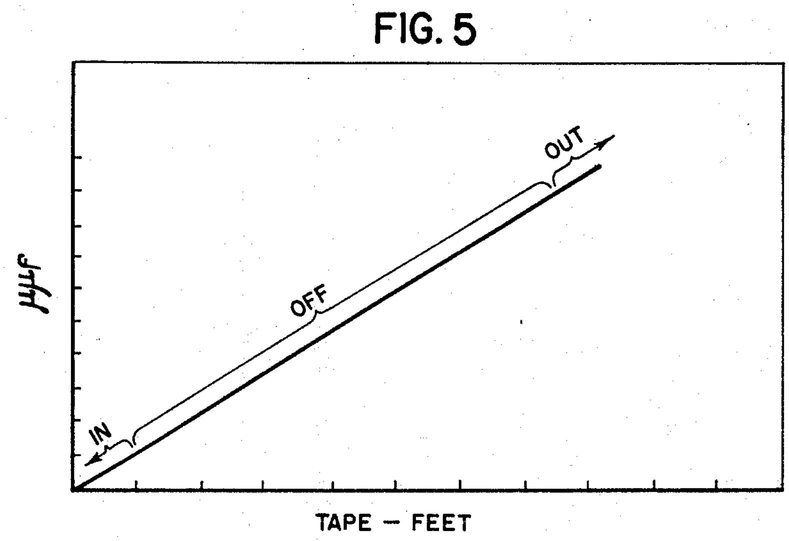
FIGURE 5 is a graph illustrating the operation of the present invention.

Reference is now made to FIGURE 5 which shows that an increase in the footage of the tape in either of the bins 22 or 60 causes a corresponding increase in the capacitance between the walls of said bin. When the capacitance between these walls is increased to a predetermined level, for example to 180 $\mu\mu f.$, the triggering circuit 133 will be activated causing operation of relay 208 so as to withdraw tape out of the bin. When the capacitance between the walls of the bin is between, for example 100 and 180 $\mu\mu f.$ neither of the triggering circuits 133 or 135 will be activated, thereby causing the reel drive motor 18 to be turned off. When the capacitance between the walls of the bin falls below, for example, 100 $\mu\mu f.$ a second triggering circuit 135 will be activated thereby causing activation of the relay 232 and resulting in the rotation of the reel drive motor 18 in the reverse directions so as to feed tape from the reel 12 into the bin 22.

In the preferred embodiment, one circuit such as that shown in FIGURE 4 is wired between bin 22 and reel drive motor 28 while a second similar circuit is wired between bin 60 and reel drive motor 20. The specific capacitance sensing and winding control circuit illustrated in FIGURE 4 is given by way of example only. Many modifications thereof will be apparent to those skilled in the art.

What is claimed:

1. A tape quantity sensing and winding control apparatus comprising in combination a frame, first and second tape storage reels mounted for rotation on said frame, a transducer connected to said frame for recording and picking up information stored on the tape, a capstan mounted on said frame adjacent to said transducer for rapidly starting, stopping, and reversing the direction of travel of said tape across said transducer, first and second storage means attached to said frame, said first storage means being adapted to hold a supply of unwound tape extending between said first reel and said capstan, said second tape storage means being adapted to hold a supply of unwound tape extending between said capstan and said second reel, first and second generally parallel electrically conductive plates comprising opposed walls of said first storage means, third and fourth generally parallel electrically conductive plates comprising opposed walls of said second storage means, said plates being insulated from one another, said tape stored in each of said storage means being interposed between said plates, means for sensing the capacitance between said first and second plates, means for causing rotation of said first reel in a direction adapted to withdraw tape from said first bin when the capacitance between said first and second plates reaches a predetermined upper level, for halting rotation of said first reel when the capacitance between said first and second plates falls between predetermined limits, and for causing rotation of said first reel in a direction adapted to feed tape into said first bin when the capacitance between first and second said plates falls below a predetermined lower level, means for sensing the capacitance between said third and fourth plates, means for causing rotation of said second reel in a direction adapted to withdraw tape from said second bin when the capacitance between said third and fourth plates reaches a predetermined upper level, for halting rotation of said second reel when the capacitance between said third and fourth plates falls between predetermined limits, and for causing rotation of said second reel in a direction adapted to feed tape into said second bin when the capacitance of said third and fourth plates falls below a predetermined lower level.

2. A tape handling apparatus comprising in combination a frame, a transducer mounted on said frame and operatively associated with a portion of the tape for recording and picking up information stored on said tape, a capstan mounted on said frame and adapted to advance the portion of said tape operatively associated with said transducer, first and second tape storage bins affixed to said frame, each of said bins being adapted to receive a quantity of unwound tape extending from said capstan, a first tape feed and withdrawal means mounted on said frame and adapted to feed tape into said first bin and adapted to withdraw tape from said first bin, second tape feed and withdrawal means mounted on said frame and adapted to feed tape into said second bin and adapted to withdraw tape from said second bin, a first pair of opposed electrically conductive walls provided on said first bin, a second pair of opposed electrically conductive walls provided on said second bin, the tape stored in each of said bins being interposed between said opposed walls, insulating material interposed between each said wall and said stored tape, first and second sensing means wired to said first and second pairs of walls respectively, a first and second control means operatively connected between said first and second sensing means and said first and second feed and withdrawal means respectively, each such sensing means including a capacitive bridge detector circuit, an oscillator wired to said capacitive bridge detector circuit, said first and second control means each comprising a first triggering circuit wired to said detector circuit and said oscillator, said first triggering circuit being adapted to operate when the capacitance between the walls of its associated bin reaches the first predetermined upper limit, a first relay operable by said first triggering circuit, said first relay being adapted to operate said feed and withdrawal means to withdraw tape from said associated bin when said first triggering circuit is operated, a second triggering circuit operatively connected to said oscillator and said capacitive bridge detector circuit, said second triggering circuit being operable when the capacitance between the walls of said associated bin reaches a second predetermined lower limit, a second relay operatively connected to said second triggering circuit, said second relay being adapted to operate said feed and withdrawal means to feed tape into said associated bin when said second triggering circuit is operated, the operation of said feed and withdrawal means being halted when the capacitance between the walls of said associated bin falls between said first predetermined level and said second predetermined level.

3. A tape quantity sensing and winding control device comprising in combination a plurality of storage bins for storing a controlled amount of unwound tape therein, means for feeding tape into and for withdrawing tape from each such bin, at least one of said bins including a first electrically conductive wall on one side thereof, and a second electrically conductive wall on the other side of said bin, said walls being insulated from each other, the tape stored in said bin being adapted to occupy the space between said walls, means for sensing the capacitance between said walls, said sensing means includes a capacitive bridge detector circuit and an oscillator wired to said capacitive bridge detector circuit, said walls being wired in said capacitive bridge detector circuit, means for comparing the signal from said oscillator with the signal from said detector circuit, control means operatively connected between said sensing means and said feeding and withdrawing means for operating said feeding and withdrawing means responsive to changes in the capacitance between said walls, said control means comprises a first triggering circuit wired to said detector circuit and said oscillator adapted to operate when the capacitance between said walls reaches a first predetermined upper limit, a first relay operable by said first triggering circuit, said first relay being adapted to operate said feeding and withdrawing means to withdraw tape from said bin when said first triggering circuit is operated, a second triggering circuit operatively connected to said oscillator and said capacitive bridge detector circuit, said second triggering circuit being operable when the capacitance between said plates reaches a second predetermined lower limit, a second relay operatively connected to said second triggering circuit, said second relay being adapted to operate said feeding and withdrawing means to feed tape into said bin when said second triggering circuit is operated.

References Cited in the file of this patent

UNITED STATES PATENTS

| | | |
|---|---|---|
| 2,679,394 | Lear | May 25, 1954 |
| 2,952,415 | Gilson | Sept. 13, 1960 |
| 2,991,920 | Emslie et al. | July 11, 1961 |
| 3,059,870 | Hall et al. | Oct. 23, 1962 |

OTHER REFERENCES

German printed application, 1,049,109, Jan. 22, 1959.